United States Patent [19]
Leibfried

[11] 3,892,796

[45] July 1, 1975

[54] HYDROGENATION OF DMT PROCESS RESIDUE AND DISTILLED DMT PROCESS RESIDUE

[75] Inventor: Raymond T. Leibfried, Newark, Del.

[73] Assignee: Hercules Incorporated, Wilmington, Del.

[22] Filed: June 21, 1973

[21] Appl. No.: 372,371

[52] U.S. Cl............................ 260/468 K; 260/514 K
[51] Int. Cl... C07c 67/06; C07c 51/36; C07c 64/71
[58] Field of Search ........ 260/475 B, 475 R, 468 K, 260/514 K

[56] References Cited
UNITED STATES PATENTS

| | | | |
|---|---|---|---|
| 3,027,398 | 3/1962 | Foohey | 260/468 |
| 3,277,153 | 10/1966 | Pieroh | 260/475 |
| 3,399,227 | 8/1968 | Tapulionis | 260/475 |

Primary Examiner—Robert Gerstl
Attorney, Agent, or Firm—Edith A. Rice; George H. Hopkins

[57] ABSTRACT

Disclosed is a process which comprises hydrogenating to substantially complete ring saturation material selected from the group consisting of DMT process residue and distilled DMT process residue, and the product of the process. The product obtained from undistilled DMT process residue can be distilled to provide a refined product of improved properties. The reaction product of alcoholic material and the product of the hydrogenation process is useful as a plasticizer and as a fluid polyol which can be reacted with isocyanates to form polyurethane end products such as, for example, foams, coatings, films and the like.

7 Claims, No Drawings

HYDROGENATION OF DMT PROCESS RESIDUE AND DISTILLED DMT PROCESS RESIDUE

This invention resides in the chemical arts. More particularly, it relates to organic chemistry.

Dimethyl terephthalate (DMT) is produced commercially by a continuous process in which p-xylene is air oxidized to p-toluic acid, the acid is esterified with methanol to methyl p-toluate which is air oxidized to the monomethyl ester of terephthalic acid, and the monomethyl ester is further esterified with methanol to form DMT. In one commercial process the air oxidations are carried out together in one stage, the esterifications are performed together in another stage, "oxidate" from the oxidation stage is introduced into the esterification stage and xylene and esterification reaction mixture from the esterification stage are introduced into the oxidation stage. Part of the esterification reaction mixture, instead of being recycled to the oxidation stage, is diverted from the oxidation-esterification system, and distilled to give a distillate comprising DMT and methyl p-toluate, and a residue. The DMT and methyl p-toluate are separated, and methyl p-toluate is returned to the oxidation stage. Some of the residue is purged from the process, while the remainder of the residue is recycled to the oxidation stage. The purged residue is called herein DMT process residue.

Until recently DMT process residue, a tar-like material, has been disposed of largely by incineration or the like, because it has appeared to have only limited commercial utility. However, although DMT process residue is equivalent to a minor proportion of the xylene introduced into the process, under present day rates of production of DMT, the quantities of residue produced are substantial and economically significant.

Consequently, efforts have been and are being undertaken to find uses for DMT process residue. This is evidenced by French Pat. No. 1,576,132, and its counterpart, The Netherlands Pat. application No. 6,810,742, opened to public inspection on Feb. 5, 1969, and the U.S. Pat. No. 3,647,759, to J. F. Walker. Hence, the need to find uses for DMT process residue in art recognized. This invention provides new uses for DMT process residue.

In summary, this invention comprises a useful product derived from DMT process residue. In addition, this invention comprises a process for treating DMT process residue to obtain this product.

The process of this invention comprises hydrogenating to substantially complete ring saturation material selected from the group consisting of DMT process residue and distilled DMT process residue.

The product of this process has utility as an intermediate in the production of products having a number of end uses. Thus, the product is a reactant which can be reacted with alcoholic material to form plasticizers, and to form fluid polyols useful in the production of polyurethane end products such as, for example, foams, coatings, films, and the like.

Although the product obtained by the foregoing process from undistilled DMT process residue has utility, a refined product of improved properties is obtained by distillation at 40°–270°C. and 0.5–5 millimeters of mercury pressure of the product obtained by the hydrogenation of undistilled DMT process residue to substantially complete ring saturation. The improved product is useful as a reactant with alcoholic material to form plasticizers and to form fluid polyols which can be reacted with isocyanates to form polyurethane end products such as, for example, foams, coatings, films, and the like.

The fraction obtained in the distillation of the product obtained by the hydrogenation of undistilled DMT process residue to substantially complete ring saturation, the distillation temperature being about 161°C. and the ambient pressure being about 0.55 millimeter of mercury, consists essentially of the monomethyl ester of cyclohexane-1,4-dicarboxylic acid. This compound with a high degree of purity can be obtained from the fraction by washing the fraction with heptane. This compound is useful as a reactant with glycols or the like to form polyester resins. It also can be hydrogenolized to 1,4-di(hydroxymethyl)cyclohexane, a polyol reactant employed commercially in the production of polyester resins.

DMT process residue is a highly complex mixture which up to now has been only partially analyzed. A major portion of the mixture comprises methyl and benzyl esters of biphenyl dicarboxylic and tricarboxylic acids. Usually it also comprises catalysts used to promote the oxidation and the esterification reactions in the DMT process. The residue at 20°–25°C. is like tar. Typical properties of the residue are:

| | | |
|---|---|---|
| Color | = | Dark Brown |
| Drop Softening Point | = | 20–70°C. |
| Acid Number (ASTM D-1639) | = | 10–50 |
| Methoxyl in COOCH$_3$ (ASTM D-1166-60) | = | 10–30% by weight |
| DMT | = | 0–6% by weight |
| Solubility (1:1 Weight Ratio of Residue to Solvent) | | |
| Acetone | = | Partially soluble |
| Methylene Chloride | = | Mostly soluble |
| Cyclohexanone | = | Mostly soluble |

The drop softening point data in this specification are obtained by the Hercules' Drop Softening Point Method. This method is described on page 12 of the booklet titled: "Wood Rosins, Modified Rosins and Related Resins," published in 1963 by Hercules Powder Company, now by change of name Hercules Incorporated. The weight of sample on the thermometer bulb is 0.50–0.55 gram. The special standard thermometer is a total immersion mercury thermometer having a range of 0.250°C. with one degree subdivisions. The bulb is 5/8 ± 1/32 inch long and ¼ ± 1/64 inch in diameter.

The solubility data herein on this specification are based on the test in which a sample of the material to be tested, and solvent are admixed at a specified weight ratio of 1:1, the mixture agitated at 20°–25°C. for 24 hours, and the solubility observation then made.

Distilled DMT process residue is the distillate obtained when distilling DMT process residue in a wiped film evaporator at 0.5–5 millimeters of mercury pressure, preferably about 1 millimeter of mercury pressure, at a jacket temperature of about 300°–350°C. Higher and lower ambient pressures and temperatures, of course, are within the broader concepts of this invention. Distilled DMT process residue is likewise a highly complex mixture which up to now has been only partially analyzed. A major portion of the mixture comprises dimethyl p-carbomethoxybenzyl terephthalate (approximately 18 percent by weight) and biphenyl carboxylic acid esters (approximately 56 percent by weight). Typical properties of distilled DMT process residue are:

| | | |
|---|---|---|
| Melt color | = | Gardner 11 |
| Drop Softening Point | = | 24°C. |
| Acid Number (ASTM D-1639) | = | 24 |
| Methoxyl in COOCH$_3$ (ASTM D-1166-60) | = | 22% by weight |
| Drastic Saponification Number (Anal. Chem. 23, 1126 (1951) | = | 486 |
| Density | = | 1.22 grams/milliliter |
| Viscosity | = | Solid |

Solubility (1:1)

| Solvent | Class of Solvent* | Solubility Parameter | Effect |
|---|---|---|---|
| Xylene | I | 8.8 | Insoluble |
| Tetralin | I | 9.5 | Insoluble |
| Tetrachloroethylene | I | 9.4 | Insoluble |
| o-Dichlorobenzene | I | 10.0 | Insoluble |
| Methylene Chloride | I | 9.7 | 99% Soluble |
| Nitromethane | I | 12.7 | Insoluble |
| Diethyl Ether | II | 7.4 | Insoluble |
| Isopropylacetate | II | 8.4 | Insoluble |
| Cyclohexanone | II | 9.9 | Insoluble |
| Acetone | II | 10.0 | Insoluble |
| Diethylene Glycol | III | 9.1 | Insoluble |
| Methanol | III | 14.5 | Insoluble |

*For explanation see Burrell, H. H., Official Digest, October 1955, and Bulletin No. 900-77A, Solubility Parameters, published by Hercules Incorporated.

Hydrogenation to the extent of substantially complete ring saturation of material selected from the group consisting of DMT process residue and distilled DMT process residue is effected by admixing the material with hydrogen at superatmospheric pressure (for example, 500 psi or greater) and a hydrogenation catalyst (for example, palladium, platinum, rhodium, ruthenium, nickel, and the like) at 100°–300°C., until the reaction mixture no longer absorbs ultraviolet light at 241 millimicrons. In general this takes about 5-6 hours.

The product obtained by the process of this invention is typically a low viscosity fluid at 20°–25°C. Typical properties of the product when obtained from undistilled DMT process residue are:

| | | |
|---|---|---|
| Color | = | Black |
| Acid Number (ASTM D-1639) | = | 73.3 |
| Methoxyl in COOCH$_3$ (ASTM D-1166-60) | = | 17.6 |
| Drastic Saponification No. [Anal.Chem. 23, 1126(1951)] | = | 384 |
| Viscosity | = | 13,000 centipoises at 25°C. |

Solubility (1:1)

| Solvent | Class of Solvent | Solubility Parameter |
|---|---|---|
| Xylene | I | 8.8 |
| Nitromethane | I | 12.7 |
| Isopropyl acetate | II | 8.4 |
| Ethanol | III | 12.7 |
| Methanol | III | 14.5 |

Typical properties of the material obtained in the distillation of the product obtained by the hydrogenation of undistilled DMT process residue are:

| | | |
|---|---|---|
| Color | = | Co/Pt 50-60 |
| Acid Number (ASTM D-1639) | = | 54.7 |
| Methoxyl in COOCH$_3$ (ASTM D-1166-60) | = | 21.1% by weight |
| Drastic Saponification No. [Anal.Chem. 23, 1126(1951)] | = | 417.5 |
| Density | = | 1.12 grams/milliliter |
| Viscosity | = | 3000 centipoises at 25°C. |

Solubility (1:1)

| Solvent | Class of Solvent | Solubility Parameter |
|---|---|---|
| Cyclohexane | I | 8.2 |
| Xylene | I | 8.8 |
| Tetrachloroethylene | I | 9.4 |
| Methylene chloride | I | 9.7 |
| Nitromethane | I | 12.7 |
| Ethyl ether | II | 7.4 |
| Isopropyl acetate | II | 8.4 |
| Isophorone | II | 9.1 |
| Acetone | II | 10.0 |
| Methyl cellosolve | II | 10.8 |
| Diethylene glycol | III | 9.1 |
| Ethanol | III | 12.7 |
| Methanol | III | 14.5 |

Typical properties of the product when obtained from distilled DMT process residue are:

| | | |
|---|---|---|
| Color | = | Co/Pt 60—60 |
| Acid Number (ASTM D-1639) | = | 63 |
| Methoxyl in COOCH$_3$ (ASTM D-1166-60) | = | 21% by weight |
| Drastic Saponification No. [Anal.Chem. 23, 1126(1951)] | = | 425 |
| Density | = | 1.06 grams/milliliter |
| Viscosity | = | 106 centipoises at 25°C. |
| Pour Point | = | −30°C. |

Solubility (1:1)

| Solvent | Effect |
|---|---|
| Xylene | Completely soluble |
| Tetralin | " |
| Tetrachloroethylene | " |
| o-Dichlorobenzene | " |
| Methylene Chloride | " |
| Nitromethane | " |
| Diethyl Ether | " |
| Isopropylacetate | " |
| Cyclohexanone | " |
| Acetone | " |
| Diethylene Glycol | " |
| Methanol | " |

Thus, it can be seen that the embodiments of the product of the process of this invention are substantially different from the starting material.

As stated above, the product of the process of this invention has utility as a reactant with alcoholic material to form useful reaction products. Reaction of the product and alcohol is effected with conventional ester interchange catalysts and procedures. Alcoholic material is material selected from the group consisting of monohydric and polyhydric alcohols. Examples of monohydric alcohols comprise straight and branched chain $C_2$-$C_{18}$ alkanols which include, for instance:

ethanol n-propanol isopropanol n-butanol sec-butanol t-butanol 2-ethyl hexanol octanol decanol octadecanol and the like, and straight and branched chain $C_1$-$C_{18}$ mono- and polyalkylene glycol ethers of said alkanols such as, for instance:

2-ethoxyethanol
2-butoxyethanol
diethylene glycol ethyl ether
diethylene glycol butyl ether and the like. Examples of polyhydric alcohols include:

ethylene glycol propylene glycol diethylene glycol glycerol sucrose pentaerythritol dipentaerythritol neopentyl glycol and the like.

Reaction products of the product of the process of this invention and monohydric alcohols are fluids which have plasticizer properties. This is also true of the reaction products of the product of this invention and polyhydric alcohols. Examples of such reaction products are the reaction product of the product of the inventive process, and material selected from the group consisting of diethylene glycol and diethylene glycol butyl ether.

As also disclosed above, the product of the process of this invention has utility as a reactant with polyhydric alcohol material to give polyols useful for reaction with isocyanates to give polyurethane end products such as foams, coatings, and films, and the like. In such use the product of the process of this invention is reacted with polyhydric alcohol material to give a polyol product. Reaction is readily effected with conventional ester interchange catalysts and procedures.

The best mode now contemplated of carrying out this invention is illustrated by the following examples of various aspects of the invention, including specific embodiments. This invention is not limited to these specific embodiments. In these examples, parts by weight are represented by $w$, parts by volume are represented by $v$, and $w$ is to $v$ as the kilogram is to the liter. Moreover, all percentages given in these examples are by weight unless otherwise specified.

EXAMPLE 1

This example illustrates the practice of one embodiment of the process of this invention.

A sample of DMT process residue is admixed with a hydrogenation catalyst and hydrogen at 2000 pounds per square inch pressure and 175°C. for three hours in a hydrogenation reactor. The hydrogenation catalyst consists essentially of palladium on carbon, the palladium concentration being 5 percent by weight of the carbon, and the concentration of the palladium and carbon together being 2% by weight of the mixture of residue and palladium on carbon.

The reaction mixture thus obtained, a mixture of fluid product and hydrogenation catalyst, is withdrawn from the reactor and filtered to remove the catalyst.

The filtrate is the desired product, a low viscosity fluid having typical properties such as those given above for the product obtained by the process of this invention from undistilled DMT process residue.

EXAMPLE 2

This example illustrates the separation of the monomethyl ester of cyclohexane-1,4-dicarboxylic acid from the product of Example 1.

A sample of the product of Example 1 is distilled at 100°–315°C. while the ambient pressure is decreased from 2.0 to 0.5 millimeters of mercury. The fraction that distills at about 161°C. and at about 0.55 millimeter of mercury pressure is collected and washed with hexane. The washed fraction consists essentially of the monomethyl ester of cyclohexane-1,4-dicarboxylic acid.

This compound is useful as a reactant with alkylene polyols to form polyester end products, and can be hydrogenolized to cyclohexane-1,4-dimethanol, a compound employed as an alcoholic reactant in one commercial process for making polyester fibers and the like.

EXAMPLE 3

This examples illustrates the preparation of a useful reaction product by reacting the product of Example 1 with fatty alcohol material.

A mixture of a sample (100 w) of Example 1 product, fatty alcohol material (146 w) consisting essentially of hexanol (23 percent of the material), octanol (37 percent of the material) and decanol (40 percent of the material), and catalyst, lead oxide (0.01 w), is established at 200°C. and maintained at this temperature for about 14 hours in a reactor fitted with a packed column to separate distillate from the reactants. During this period of time a distillate (17 v) consisting essentially of methanol is collected. The resulting reaction mixture is distilled at 60°–228°C. at 1.0 millimeter of mercury pressure to move excess alcoholic material. The result is a fluid product having the following typical properties:

| | | |
|---|---|---|
| Acid Number (ASTM D-1639) | = | 3.6 |
| Methoxyl in COOCH$_3$ (ASTM D-1166-60) | = | 1.49% by weight |
| % OH (ASTM E-222) | = | 3.6 |

This reaction product has utility as a plasticizer for nitrile rubber.

EXAMPLE 4

This example illustrates the practice of the process of this invention with respect to distilled DMT process residue.

DMT process residue is distilled in a wiped film evaporator at a jacket temperature of about 300°–350°C. and at an ambient pressure of about 1 millimeter of mercury.

The distillate, distilled DMT process residue, is admixed with a hydrogenation catalyst and hydrogen at 2000 pounds per square inch hydrogen pressure and at 260°C. in a hydrogenation reactor. The hydrogenation catalyst consists essentially of palladium on carbon, the concentration of palladium being 5 percent by weight of the carbon. The concentration of the palladium and carbon together in the reaction mixture is about 2 percent by weight of the mixture of distilled DMT process residue and the palladium on carbon.

The fluid reaction mixture that results is withdrawn from the reactor and filtered to remove the catalyst.

The filtrate is the desired product. It has the typical properties given above for the product obtained by the process of this invention from distilled DMT process residue.

EXAMPLE 5

This example illustrates the preparation of a reaction product of diethylene glycol butyl ether, diethylene glycol, and the product of Example 4, which is useful as a plasticizer.

A mixture of diethylene glycol butyl ether (328 w), diethylene glycol (44.5 w), Example 4 product (344 w) and catalyst, zinc acetate (0.34 w), is established and maintained at 230-250°C. for about 10 hours in a reactor having a packed column to separate distillate from reactants. During this period of time a distillate (72 w) consisting essentially of methanol is collected. The resulting reaction mixture is established and maintained at 140°-250°C. at 30 millimeters of mercury pressure to remove unreacted reactants. The material that remains is the desired product.

Typically the product at 20°-25°C is a low viscosity fluid having the following properties:

| | | |
|---|---|---|
| Acid Number (ASTM D-1639) | = | 0.70 |
| Methoxyl in COOCH$_3$ (ASTM D-1166-60) | = | 1.48% by weight |
| Hydroxyl (ASTM E-222) | = | 0.25% by weight |

The reaction product of this example has utility as a plasticizer for nitrile rubber.

EXAMPLES 6-8

These examples illustrate typical nitrile rubber compositions containing plasticizers of this invention.

The formulation of these compositions is:

| Components | w |
|---|---|
| Hycar 1042 Nitrile Rubber | 100.0 |
| Zinc Oxide | 5.0 |
| Blackbird Sulfur | 1.5 |
| SRF Carbon Black | 60.0 |
| Stearic Acid | 1.0 |
| Benzolthiazyl Disulfide | 1.5 |
| Plasticizer | 30.0 |

The particular plasticizers of this invention to which these examples pertain are (Example 6) the reaction product of diethylene glycol butyl ether and hydrogenated distilled DMT process residue at a ratio of 3 OH equivalents of the ether to 3 COOCH$_3$ equivalents of the hydrogenated distilled DMT process residue, (Example 7) the reaction product of diethylene glycol (1 OH equivalent), diethylene glycol butyl ether (2 OH equivalents), and hydrogenated distilled DMT process residue (3 COOCH$_3$ equivalents), and (Example 8) the reaction product of diethylene glycol (2 OH equivalents), diethylene glycol butyl ether (1 OH equivalent), and hydrogenated distilled DMT process residue.

The plasticizers of this invention are incorporated into batches of nitrile rubber and other components of the foregoing formulation by milling the batch and plasticizers at 160°-180°F. for about 40-45 minutes. Thereafter the rubber compositions are cured in a press at 310°F. for 30 minutes.

The following table shows typical properties of samples of the nitrile rubber compositions without plasticizers, with dioctyl phthalate as the plasticizer and with plasticizers of this invention.

TABLE I

| | Example 6 | | Example 7 | | Example 8 | |
|---|---|---|---|---|---|---|
| Plasticizer | Reaction Product of Diethylene Glycol Butyl Ether & Hydrogenated Distilled DMT Process Residue | | Reaction Product of Diethylene Glycol, Diethylene Glycol Butyl Ether & Diethylene Glycol-Glycol Ether Hydrogenated Distilled DMT Process Residue (1:2:3 eq.) | | Reaction Product of Diethylene Glycol, Diethylene Glycol Butyl Ether and Hydrogenated Distilled DMT Process Residue (2:1:3 eq.) | |
| Processability | Good | | Fair–Good | | Good | |
| Minutes required for incorporation | 45 | | 56 | | 45 | |
| Uncured stock - bleed | No | | No | | No | |
| Cured stock - bleed | No | | No | | No | |
| Mooney viscosity "M.L" 4 hrs. at 212°F. | 32 | | 35 | | 42 | |
| | Unaged | *Aged | Unaged | *Aged | Unaged | *Aged |
| Modulus at 100% elong. psi | 125 | 405 | 155 | 360 | 150 | 365 |
| Modulus at 200% elong., psi | 380 | 1265 | 370 | 1230 | 330 | 1255 |
| Modulus at 300% elong., psi | 810 | — | 790 | — | 735 | — |
| Tensile Strength,psi | 2110 | 1440 | 2535 | 2000 | 2475 | 2370 |
| Elongation at break,% | 540 | 220 | 640 | 250 | 680 | 300 |
| Shore " A" hardness | 47 | 62 | 47 | 62 | 49 | 62 |
| Torsional Rigidity | | | | | | |
| Modulus rigidity —°C. to obtain 10,000 psi (ASTM D-1043) | -31.6 | -26.2 | -28.3 | -22.5 | -20.0 | -15 |
| Plasticizer Volatility | | | | | | |
| % Plast. wt. loss after 70 hrs. at 257°F. | | 16.3 | | 12.8 | | 6.3 |
| % Sample Wt. loss after 70 hrs. at 257°F. | | 2.46 | | 1.93 | | 0.95 |
| Plasticizer | Dioctyl phthalate | | None | | | |
| Processability | Good | | Fair | | | |
| Minutes required for incorporation | 50 | | 45 | | | |
| Uncured stock - bleed | No | | — | | | |
| Cured stock - bleed | No | | — | | | |

TABLE I—Continued

|  | Example 6 | | Example 7 | | Example 8 |
| --- | --- | --- | --- | --- | --- |
| Mooney viscosity "M.L." 4 hrs. at 212°F. | 31 | | 88 | | |
|  | Unaged | *Aged | Unaged | *Aged | |
| Modulus at 100% elong., psi | 85 | 630 | 365 | 810 | |
| Modulus at 200% elong., psi | 300 | — | 955 | — | |
| Modulus at 300% elong., psi | 645 | — | 1890 | — | |
| Tensile Strength, psi | 2390 | 1905 | 2940 | 2475 | |
| Elongation at break, % | 680 | 200 | 430 | 200 | |
| Shore "A" hardness | 46 | 72 | 66 | 75 | |
| Torsional Rigidity | | | | | |
| Modulus rigidity - °C. to obtain 10,000 psi (ASTM D-1043) | −34.4 | −17.0 | −18.4 | −15.8 | |
| Plasticizer Volatility | | | | | |
| % Plast. wt. loss after 70 hrs. at 257°F. | | 95.8 | | — | |
| % Sample wt. loss after 70 hrs. at 257°F. | | — | | — | |

The plasticizers of Examples 6-8 are comparable to dioctyl phthalate in processability, compatibility, softness, tensile properties and low temperature flexibility in the nitrile rubber formulation. However, after heat aging of the plasticized nitrile rubber compositions, the Examples 6-8 compositions were superior to the composition containing dioctyl phthalate. After heat aging the nitrile rubber samples at 257°F. for 70 hours, the dioctyl phthalate had almost completely volatilized as indicated by the 95.8 percent plasticizer weight loss, and the composition had hardened as indicated by the Shore A hardness and modulus increase, while the low temperature flexibility had decreased markedly. On the other hand, after the Example 8 nitrile rubber samples had been aged at 257°F. for about 70 hours, they showed very little weight loss and substantially less change in physical properties.

EXAMPLE 9

This example illustrates the preparation of a reaction product of polyol material and hydrogenated distilled DMT process residue, which is useful as a polyol reactant with urethanes to form useful polyurethane end products.

A mixture of Example 4 product (1666 w), diethylene glycol (1590 w) and catalyst, tetra-2-ethylhexyl titanate (3.25 w), is established and maintained with stirring for approximately 6 hours at 250°C. in a reactor equipped with a sadddle-packed, steamjacketed column to separate distillate and return diethylene glycol to the reaction mixture. During the 6 hours of reaction, distillate (405 v) is collected. Subsequently, excess diethylene glycol is separated from the reaction mixture by distillation at 110°C. and 3.5 millimeters of mercury pressure. The material remaining in the reactor is filtered to remove the titanate catalyst.

The filtrate is the desired product, a fluid polyol having the following typical properties:

| | | |
| --- | --- | --- |
| Color | = | yellow, clear |
| OH Number (ASTM E-222) | = | 145 |
| OH (ASTM E-222) | = | 4.4% |
| OH Equivalent Weight (ASTM E-222) | = | 384 |
| Viscosity at 25°C. | = | 38,000 centipoises |
| H$_2$O | = | 0.05% |

The relatively high OH equivalent weight is a distinct advantage when a comparatively inexpensive polyol is reacted with a costly isocyanate, because less polyisocyanate is needed to obtain a polyurethane of desired molecular weight. Thus, the polyol of this example can be reacted with one-third its weight of polymethylene polyphenyl isocyanate to obtain a polyurethane of properties comparable to those polyurethanes obtained by reacting with an equal weight of the polyisocyanate most commercial polyols sold for use in making polyurethanes.

EXAMPLE 10

This example illustrates the utility of the polyol product of Example 9 in the preparation of foamed in-place or molded, rigid, high density polyurethane foam.

The formulation of the foam of this example is:

| A Component | |
| --- | --- |
| Ingredients | Quantities |
| Example 9 Product Polyol | 38.4 w |
| Freon 11 monofluorotrichloromethane | 7 w |
| Dimethyl ethanolamine | 0.1 w |
| L5310 Silicone Surfactant (Union Carbide) | 0.5 v |
| B Component | |
| Ingredient | Quantity |
| Polymethylene Polyphenylisocyanate | 13.5 w |

The A component is made by admixing the components together at 20°–25°C. and atmospheric pressure.

The foam of this formulation is made by quickly admixing the A and B components, pouring the resulting mixture into a mold, closing the mold, and opening the mold about 10 minutes later.

The following data are typical of the foam of this example when a sample of the B component is quickly admixed with a sample of the A component in a 9 ounce cup:

| | | |
|---|---|---|
| Cream time (mixed) | 55 | seconds |
| Rise start time | 2 | minutes |
| Tack-free time | 8.5 | minutes |

EXAMPLE 11

This example illustrates the utility of the Example 9 polyol product in the preparation of sprayed polyurethane foam insulation.

The formulation of this foam is:

| A Component | |
|---|---|
| Ingredients | Quantities |
| Example 9 Product Polyol | 38.4 w |
| Water | 0.4 v |
| Dimethyl ethanolamine | 0.13 w |
| Dibutyl tin dilaurate | 0.13 w |
| L5310 Silicone Surfactant (Union Carbide) | 0.5 v |
| B Component | |
| Ingredient | Quantity |
| Polymethylene Polyphenylisocyanate | 13.5 w |

The A component is made by admixing the ingredients at 20°–25°C. and atmospheric pressure.

The foam is made by simultaneously bringing together in a spray gun at rates equivalent to the spray rates the A and B components while spraying the resulting mixture on a surface to be insulated.

The following data are typical of the foam of this example when a sample of the B component is quickly admixed with a sample of the A component in a 9 ounce cup:

| | |
|---|---|
| Cream time (mixed) | 20 seconds |
| Rise start time | 30 seconds |
| Tack-free time | 1 minute |

Thus, this invention provides a process for converting DMT process residue into useful products.

Other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. A process which comprises hydrogenating to substantially complete ring saturation material selected from the group consisting of DMT process residue and distilled DMT process residue by admixing said material with hydrogen at superatmospheric pressure and a hydrogenation catalyst at 100–300°C. until the reaction mixture no longer absorbs ultra-violet light at 241 millimicrons; said DMT process residue being the residue purged from the continuous process for the production of DMT, which comprises the air oxidation of p-xylene to p-toluic acid, the esterification of said acid with methanol to methyl p-toluate, the air oxidation of methyl p-toluate to the monomethyl ester of terephthalic acid, and the esterification of said monomethyl ester with methanol to DMT, said air oxidations being carried out together in a first stage to form an oxidate, said esterifications being performed together in a second stage to form an esterification reaction mixture, with said oxidate and methanol being introduced into said second stage, xylene and part of said esterification reaction mixture being introduced into said first stage, and the remainder of said esterification reaction mixture being distilled to give a distillate comprising DMT and methyl p-toluate, and a residue, part of which is introduced into said first stage and the remainder of which is purged.

2. A process according to claim 1 in which the product obtained by hydrogenating to substantially complete ring saturation material consisting essentially of DMT process residue is distilled at 40°–270°C. and 0.5–5 millimeters of mercury pressure.

3. A process according to claim 2 in which the distillation fraction obtained at a temperature of about 161°C. and an ambient pressure of about 0.55 millimeter of mercury is isolated.

4. A process according to claim 1 in which the material that is hydrogenated consists essentially of distilled DMT process residue obtained by distilling DMT process residue in a wiped film evaporator at 0.5–5 millimeters of mercury pressure at a jacket temperature of about 300°–350°C.

5. The product obtained by hydrogenating to substantially complete ring saturation material selected from the group consisting of DMT process residue and distilled DMT process residue by admixing said material with hydrogen at superatmospheric pressure and a hydrogenation catalyst at 100°–300°C. until the reaction mixture no longer absorbs ultraviolet light at 241 millimicrons; said DMT process residue being the residue purged from the continuous process for the production of DMT, which comprises the air oxidation of p-xylene to p-toluic acid, the esterification of said acid with methanol to methyl p-toluate, the air oxidation of methyl p-toluate to the monomethyl ester of terephthalic acid, and the esterification of said monomethyl ester with methanol to DMT, said air oxidations being carried out together in a first stage to form an oxidate, said esterifications being performed together in a second stage to form an esterification reaction mixture, with said oxidate and methanol being introduced into said second stage, xylene and part of said esterification reaction mixture being introduced into said first stage, and the remainder of said esterification reaction mixture being distilled to give a distillate comprising DMT and methyl p-toluate, and a residue, part of which is introduced into said first stage and the remainder of which is purged.

6. The product obtained by (a) hydrogenating to substantially complete ring saturation DMT process residue by admixing said DMT process residue with hydrogen at superatmospheric pressure and a hydrogenation catalyst at 100-300°C. until the reaction mixture no longer absorbs ultraviolet light at 241 millimicrons, whereby a hydrogenated reaction mixture is obtained, and (b) distilling said hydrogenated reaction mixture at 40°–270°C. and .5–5 millimeters of mercury pressure; said DMT process residue being the residue purged from the continuous process for the production of DMT, which comprises the air oxidation of p-xylene to p-toluic acid, the esterification of said acid with methanol to methyl p-toluate, the air oxidation of methyl p-toluate to the monomethyl ester of terephthalic acid, and the esterification of said monomethyl ester with methanol to DMT, said air oxidations being carried out together in a first stage to form an oxidate, said esterifications being performed together in a second stage to form an esterification reaction mixture, with said oxidate and methanol being introduced into said second stage, xylene and part of said esterification reaction mixture being introduced into said first stage, and the remainder of said esterification reaction mixture being distilled to give a distillate comprising DMT and methyl p-toluate, and a residue, part of which is introduced into said first stage, and the remainder of which is purged.

7. The reaction product of alcoholic material and the product of the process which comprises hydrogenating to substantially complete ring saturation material selected from the group consisting of DMT process residue and distilled DMT process residue, said hydrogenating being effected by admixing said material with hydrogen at superatmospheric pressure and a hydrogenation catalyst at 100°–300°C. until the reaction mixture no longer absorbs ultraviolet light at 241 millimicrons; said alcoholic material being selected from the group consisting of straight and branched chain $C_2$-$C_{18}$ alkanols, straight and branched chain $C_1$-$C_{18}$ mono- and polyalkylene glycol ethers of said alkanols, ethylene glycol, propylene glycol, diethylene glycol, glycerol, sucrose, pentaerythritol, dipentaerythritol and neopentyl glycol and said DMT process residue being the residue purged from the continuous process for the production of DMT, which comprises the air oxidation of p-xylene to p-toluic acid, the esterification of said acid with methanol to methyl p-toluate, the air oxidation of methyl p-toluate to the monomethyl ester of terephthalic acid, and the esterification of said monomethyl ester with methanol to DMT, said air oxidations being carried out together in a first stage to form an oxidate, said esterifications being performed together in a second stage to form an esterification reaction mixture, with said oxidate and methanol being introduced into said second stage, xylene and part of said esterification reaction mixture being introduced into said first stage, and the remainder of said esterification reaction mixture being distilled to give a distillate comprising DMT and methyl p-toluate, and a residue, part of which is introduced into said first stage and the remainder of which is purged.

* * * * *

UNITED STATES PATENT OFFICE
CERTIFICATE OF CORRECTION

PATENT NO. : 3,892,796
DATED : July 1, 1975
INVENTOR(S) : Raymond T. Leibfried

It is certified that error appears in the above-identified patent and that said Letters Patent are hereby corrected as shown below:

Column 9, bottom of Table I of printed patent;
"Footnote is missing" should read --*Heat aged at 257°F. for 70 hrs.--

Signed and Sealed this ninth Day of September 1975

[SEAL]

Attest:

RUTH C. MASON
Attesting Officer

C. MARSHALL DANN
Commissioner of Patents and Trademarks